United States Patent [19]
Park et al.

[11] Patent Number: 5,797,138
[45] Date of Patent: Aug. 18, 1998

[54] BUFFER MANAGEMENT METHOD USING BUFFER LOCKING MECHANISM IN STORAGE SYSTEM FOR SUPPORTING MULTI-USER ENVIRONMENT

[75] Inventors: Soon-Young Park; Jin-Soo Lee; Dae-Young Hur, all of Yusong-ku; Young-Chul Park, Book-ku, all of Rep. of Korea

[73] Assignee: Electronics and Telecommunications Research Institute, Daejeon, Rep. of Korea

[21] Appl. No.: 712,596

[22] Filed: Sep. 13, 1996

[30] Foreign Application Priority Data

Dec. 6, 1995 [KR] Rep. of Korea ............... 1995 47072

[51] Int. Cl.$^6$ .................................................. G06F 12/00
[52] U.S. Cl. ................................................. 707/8; 711/163
[58] Field of Search ................................... 395/608, 726, 395/479, 490; 711/163

[56] References Cited

U.S. PATENT DOCUMENTS

| | | | |
|---|---|---|---|
| 4,482,956 | 11/1984 | Tallman | 395/726 |
| 5,247,672 | 9/1993 | Mohan | 711/152 |
| 5,327,556 | 7/1994 | Mohan et al. | 707/8 |
| 5,339,427 | 8/1994 | Elko et al. | 395/673 |

FOREIGN PATENT DOCUMENTS 0499422  8/1992  European Pat. Off. .

OTHER PUBLICATIONS

Dave et al.; A Low–Latency Scalable Locking Algorithm for Shared Memory Multiprocessors; Parallel and Distributed Processing. 1994 Symp.; pp. 10–17.

*Primary Examiner*—William M. Treat
*Assistant Examiner*—Kenneth R. Coulter
*Attorney, Agent, or Firm*—Antonelli, Terry, Stout, Kraus, LLP

[57] ABSTRACT

A buffer management method using a buffer locking mechanism in a storage system for supporting a multi-user environment. The buffer hash anchor is acquired with no exclusive latch while allocation of the empty buffer is required to read a desired page into the buffer using a buffer locking chain including buffer locking entries in the form of a list. Page locking is executed only when a buffer associated with a desired page does not exist in the buffer frame chain. Accordingly, there is no interference with transactions requiring access to other pages. It is also possible to prevent the buffer hash anchor from using an exclusive latch for a lengthy period of time due to other transactions concurrently requiring allocation of empty buffers. Therefore, there is no degradation in performance of the entire system. Since the page locking is executed only for a page read from the disk, the overhead required for the page locking is minimized. As a result, management of buffers can be efficiently achieved without unnecessary disk input/output operations, thereby improving the performance of the storage system.

4 Claims, 3 Drawing Sheets

BUFFER MANAGEMENT METHOD USING BUFFER LOCKING MECHANISM IN STORAGE SYSTEM FOR SUPPORTING MULTI-USER ENVIRONMENT

BACKGROUND OF THE INVENTION

1. Field of the Invention

The present invention relates to a buffer management method using a buffer locking mechanism in a storage system for supporting a multi-user environment, and more particularly to such a buffer management method capable of maximizing a buffer management effect used to achieve an improvement in the performance of the storage system by efficiently processing concurrent access of several users to the same disk page.

2. Description of the Prior Art

Buffers are memory spaces used to keep in a memory frequently used data stored in a disk which is a physical storage space.

The buffer management module, which is one of the modules included in a storage system, serves to manage buffer spaces allocated in a memory. In other words, the buffer management module keeps, in a buffer, frequently used data stored in a disk which is a physical storage space.

The main function of such a buffer manager is to read frequently used pages of a disk into a buffer of the memory which is immediately accessible, and to appropriately flush the pages kept in the buffer to corresponding pages of the disk by an operative connection with a recovery manager of the system, thereby minimizing access to the disk for data processing.

Such a buffer is one of frequently accessible resources in the storage system. It is possible to minimize disk input/output operations for data processing by an efficient buffer management of the buffer manager. In this case, the storage system obtains an improvement in performance.

To process a user's demand, access to a desired page of a disk may be carried out. In this case, if there is no buffer including an image corresponding to the page required to process the user's demand, the page is typically read from the disk into a buffer in order to process data on the page. Such a page reading operation may be concurrently carried out by many users who use the same storage system. The operation of reading a page from a disk into a buffer may be repeated by the number of user's demands.

In this case, however, a plurality of buffers must be used even when several users request the reading operation for the same page. This results in the following problems:

First, there is waste of buffer space;

Second, unnecessary disk input/output operations are required;

Third, a wasteful overhead is required for buffer replacement; and

Fourth, there may be an inconsistency between the content of a buffer and the content of the corresponding disk page.

In order to avoid a degradation in system performance due to such problems, it is required to perform disk input/output operations in such a manner that they are not repeated for the same page.

As representative methods conventionally used to solve the above-mentioned problems, there are two methods as follows.

The first one of these methods is to scan a buffer having the image of a desired page while acquiring an exclusive latch to a buffer hash anchor, which manages the buffer corresponding to the page, in order to achieve access to the page.

In accordance with this method, where the buffer exists in the buffer frame chain, it is acquired with an exclusive latch. At the same time, the exclusive latch acquired to the buffer hash anchor is released. In this state, the buffer is used.

If a desired page does not exist in any buffers of the buffer frame chain, it is acquired from a disk. Thereafter, a buffer, in which the page will be placed, is allocated and then connected to the buffer frame chain while not releasing the exclusive latch acquired to the buffer hash anchor in order to prevent processing of requests for the same page by other transactions. After the connection, the exclusive latch of the buffer hash anchor is released.

The page is then read from the disk into the allocated buffer. Subsequently, the exclusive latch of the buffer is released so that the buffer can be used.

This method, which involves allocating an empty buffer and continuously latching the buffer hash anchor while the buffer is connected to the buffer frame chain, is advantageous in that it can simply prevent repeated disk input/output operations for the same page.

However, this method has a problem in that other transactions requiring access to pages other than the page associated with the exclusive latch can not access to their buffer frame chains until the exclusive latch of the buffer hash anchor is released.

As a result, where a plurality of transactions simultaneously require empty buffers, the time keeping the exclusive latch to the buffer hash anchor is lengthened. This results in an abrupt degradation in system performance.

The second method is to lock a desired page in an exclusive mode to achieve access to that page.

In accordance with this method, access to the buffer hash anchor is carried out, once locking of a desired page is achieved.

Where a buffer containing the image of a desired page exists in the buffer frame chain, it is used, and the locking of that page is released.

If such a buffer associated with a desired page does not exist in the buffer frame chain, an empty buffer is allocated. Thereafter, an exclusive latch is acquired to the buffer hash anchor. In this state, the allocated empty buffer is connected to the buffer frame chain. The exclusive latch of the buffer hash anchor is then released.

The page is then read from the disk into the allocated buffer to use the buffer. After using the buffer, the locking of the page is released.

This method, which involves locking a desired page and maintaining the lock until that page is completely used, is advantageous in that it can simply prevent repeated disk input/output operations for the same page. In particular, this method does not involve any interference with operations of other transactions requiring other pages because a desired page is read into the buffer while being locked.

However, this method requires an overhead for maintaining a locking table for all pages to which transactions access because page locking should be carried out every time a page is scanned. The requirement of such a locking in an exclusive mode every time a buffer is used results in a degradation in system performance.

SUMMARY OF THE INVENTION

Therefore, an object of the invention is to provide a buffer management method capable of efficiently processing transactions requiring access to the same page, which does not exist in a memory buffer, without executing unnecessary disk input/output operations and without any interference with other transactions accessing other pages when the page is read from a disk to the buffer so that the buffer manager accesses to the page to process a user's demand.

In accordance with the present invention, this object is accomplished through a buffer management method for efficiently managing concurrent access of a number of users to the same page of a disk using a buffer management structure including buffer locking entries each used for a transaction, which currently executes a disk reading operation, to lock a desired page, a buffer locking chain adapted to maintain the buffer locking entries in the form of a list, a buffer frame chain provided with buffers for pages and a buffer hash anchor adapted to use an exclusive latch, thereby achieving an improvement in performance of a storage system, the method comprising the steps of: (a) acquiring an exclusive latch to the buffer hash anchor by a transaction accessing to an optional page, and then determining whether or not a desired buffer associated with the page is included in the buffer frame chain; (b) scanning the buffer locking chain only when it is determined at the step (a) that the buffer associated with the page is not included in the buffer frame chain, thereby determining whether or not a buffer locking entry associated with the page exists in the buffer locking chain; (c) if it is determined at the step (a) that the buffer associated with the page is included in the buffer frame chain, then acquiring an exclusive latch to the buffer, releasing the exclusive latch of the buffer hash anchor, and using the page placed in the buffer; (d) if it is determined at the step (b) that the buffer locking entry associated with the page exists in the buffer locking chain, then registering information about the transaction in a channel of the buffer locking entry, releasing the exclusive latch of the buffer hash anchor, and acquiring an exclusive latch to the buffer hash anchor after a predetermined blocking time elapses; and (e) maintaining the page in a locked state only when it is determined at the step (b) that the buffer locking entry associated with the page does not exist in the buffer locking chain.

The buffer hash anchor is acquired with no exclusive latch while allocation of the empty buffer is required to read a desired page into the buffer using a buffer locking chain including buffer locking entries in the form of a list. Page locking is executed only when a buffer associated with a desired page does not exist in the buffer frame chain. Accordingly, there is no interference with transactions requiring access to other pages. It is also possible to prevent the buffer hash anchor from using an exclusive latch for a lengthy period of time due to other transactions concurrently requiring allocation of empty buffers. Therefore, there is no degradation in performance of the entire system. Since the page locking is executed only for a page read from the disk, the overhead required for the page locking is minimized. As a result, management of buffers can be efficiently achieved without unnecessary disk input/output operations, thereby improving the performance of the storage system.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
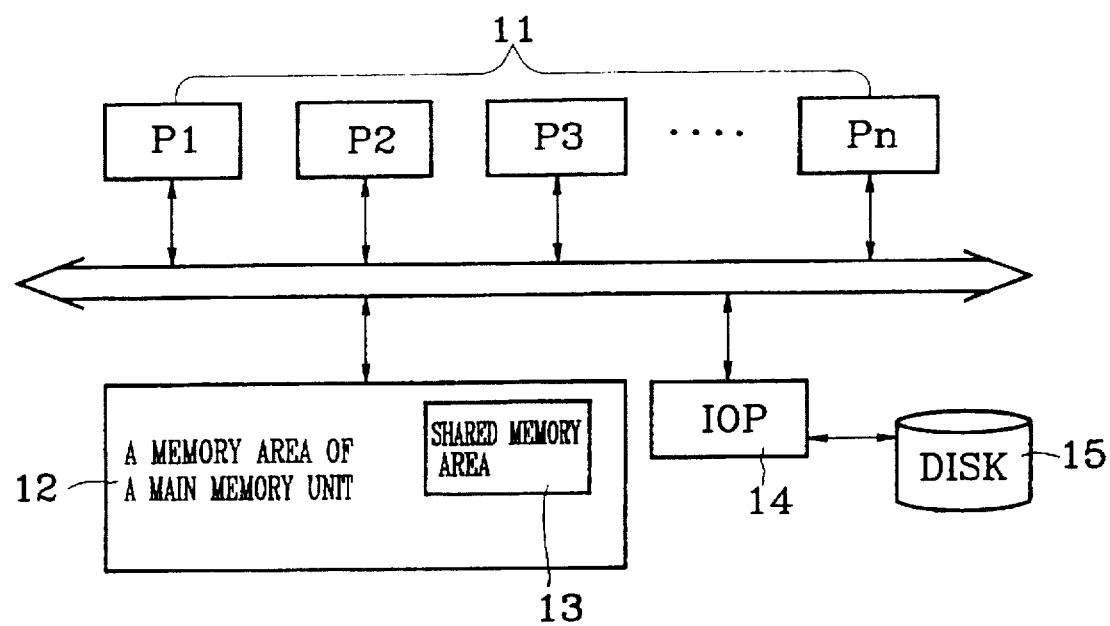
FIG. 1 is a diagram illustrating a hardware to which the present invention is applied.

FIG. 1 illustrates a hardware environment to which the present invention is applied.

In FIG. 1, the reference numeral 11 denotes processors 12 a memory area of a main memory unit, 13 a shared memory area of the main memory unit, 14 an input/output processor (IOP), and 15 a disk which is an auxiliary memory unit.

The present invention can operate in such a hardware environment typically including a single processor or multi-processor and a shared memory area.

Figure 2:
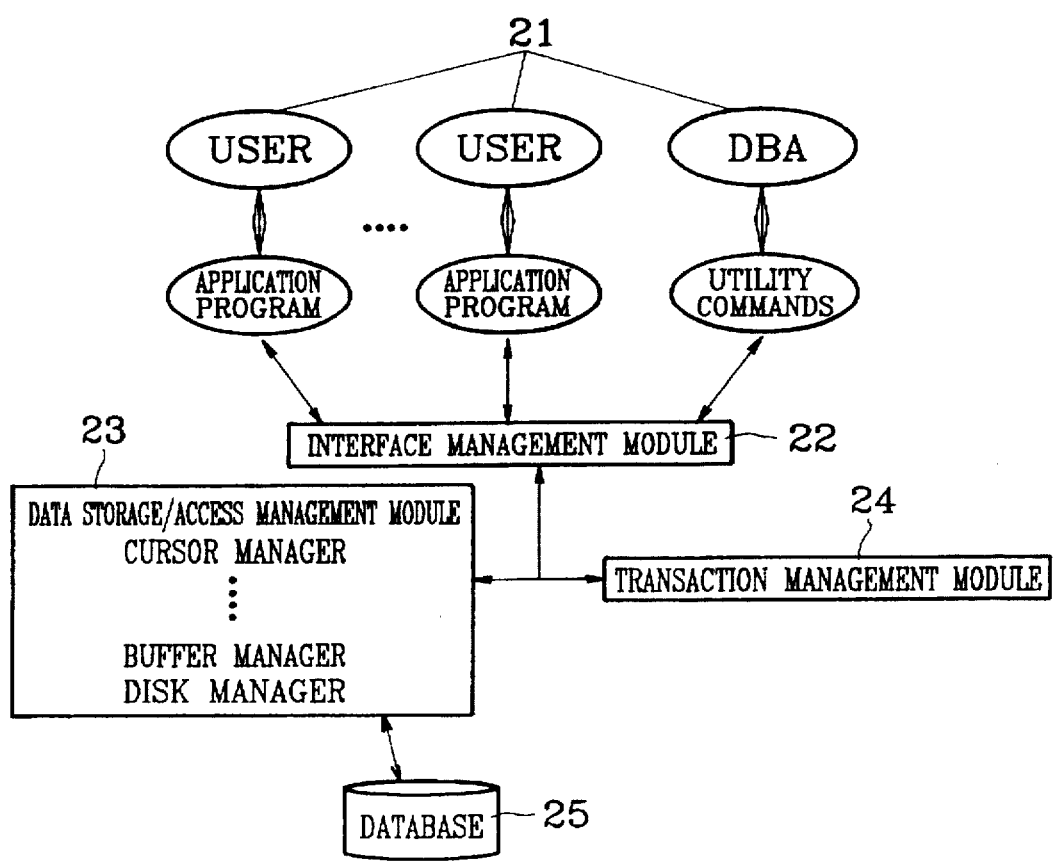
FIG. 2 is a diagram illustrating a module structure of a storage system to which the present invention is applied.

FIG. 2 is a module structure of a storage system to which the present invention is applied.

The storage system basically includes an interface management module 22 for connecting users to the system, a data storage/access management module 23 for creating a database 25 at a disk and manipulating the database 25, and a transaction management module 24 for achieving concurrency control and recovery for transactions.

The data storage/access management module includes a buffer manager which uses a buffer locking mechanism according to the present invention.

Figure 3:
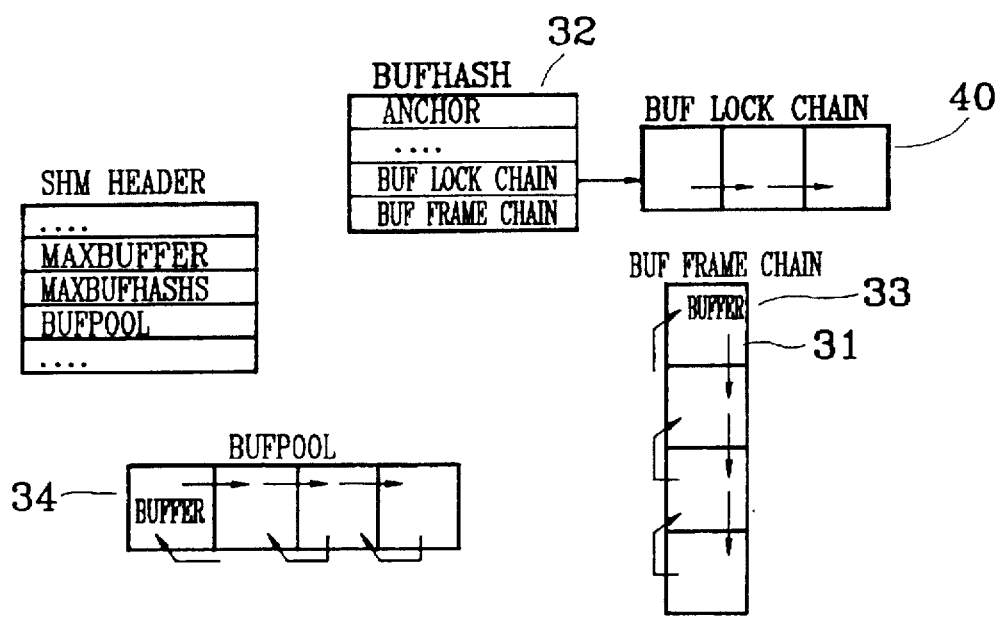
FIG. 3 is a diagram illustrating objects used to manage buffers in the storage system to which the present invention is applied.

FIG. 3 illustrates objects used to manage buffers in the storage system to which the present invention is applied. In this figure, only portions needed to explain the present invention are shown.

Where a desired page of a disk is read into a buffer 31 on a user's demand, the buffer 31 is connected to the buffer frame chain 33 of a buffer hash 32 associated therewith. The buffer 31 keeps this connection state while it has the image of the disk page which is an effective page.

In other words, the buffer connected to the buffer frame chain maintains its connection state until the page included therein is effective no longer or until it has the image of other page in accordance with a buffer replacement algorithm.

If a desired page does not exist in any buffers of the buffer frame chain, it should be read from a disk. In this case, an empty buffer is newly allocated from a buffer pool 34.

The buffer locking mechanism of the present invention is a mechanism capable of managing buffers while maintaining a buffer locking chain, thereby preventing a repetitive allocation of buffers for the same disk page. Also, the buffer locking mechanism efficiently manages buffers without interfering with other transactions accessing to other pages.

Figure 4:
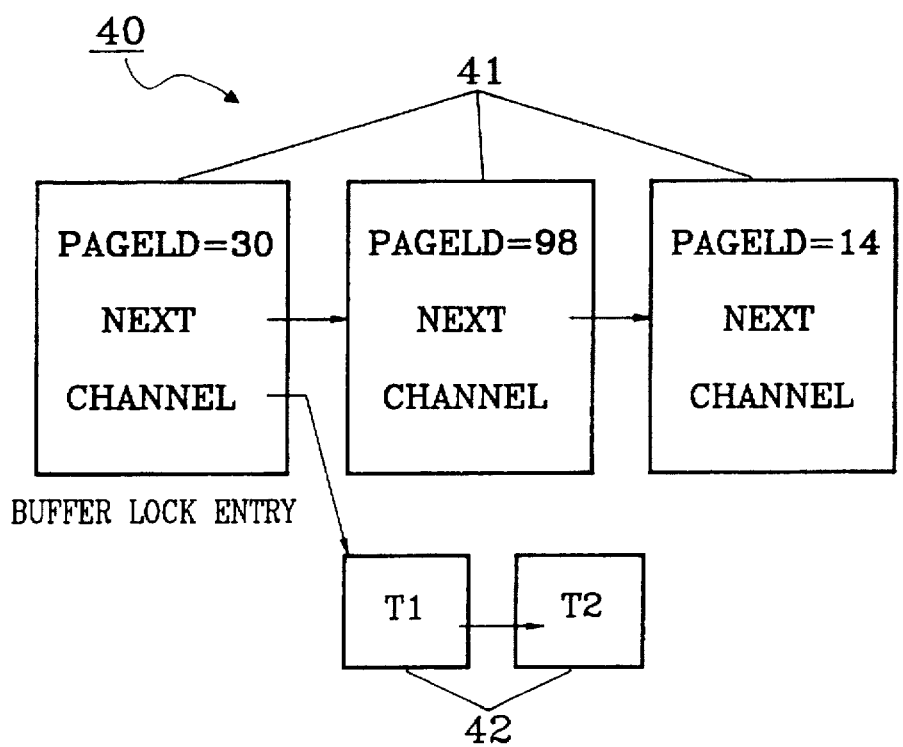
FIG. 4 is a diagram illustrating the structure of a buffer locking chain used in a buffer locking mechanism according to the present invention.

FIG. 4 illustrates the structure of a buffer locking chain used in the buffer locking mechanism according to the present invention.

The buffer locking chain includes buffer locking entries 41 which are structured in the form of a list. Each buffer locking entry of the buffer locking chain has the following structure:

```
struct buf_lock {
    T_PID          PageID;
    struct buf_lock *next;
    T_TRANS        *channel;
};
```

In the structure of each buffer locking entry, "PageID" represents a page identifier for a page to be read from the disk, "next" represents a pointer indicating next buffer locking entry; and "channel" represents a list indicating transactions 42 waiting for the reading of the page identified by the "PageID" from the disk.

When several users request access to the same disk page, the buffer locking entry associated with that page serves to hold the locking of that page carried out by the transaction which currently executes a disk reading operation so that other transactions can not execute a buffer allocation and disk reading operation for the same page.

In other words, the transaction, which executes a disk reading operation, structures a buffer locking entry associated with a desired page and then connects the buffer locking entry to the buffer locking chain.

After completely reading a desired page from the disk into a buffer, the transaction deletes the associated buffer locking entry from the buffer locking chain, thereby releasing the locking of that page.

Figure 5:
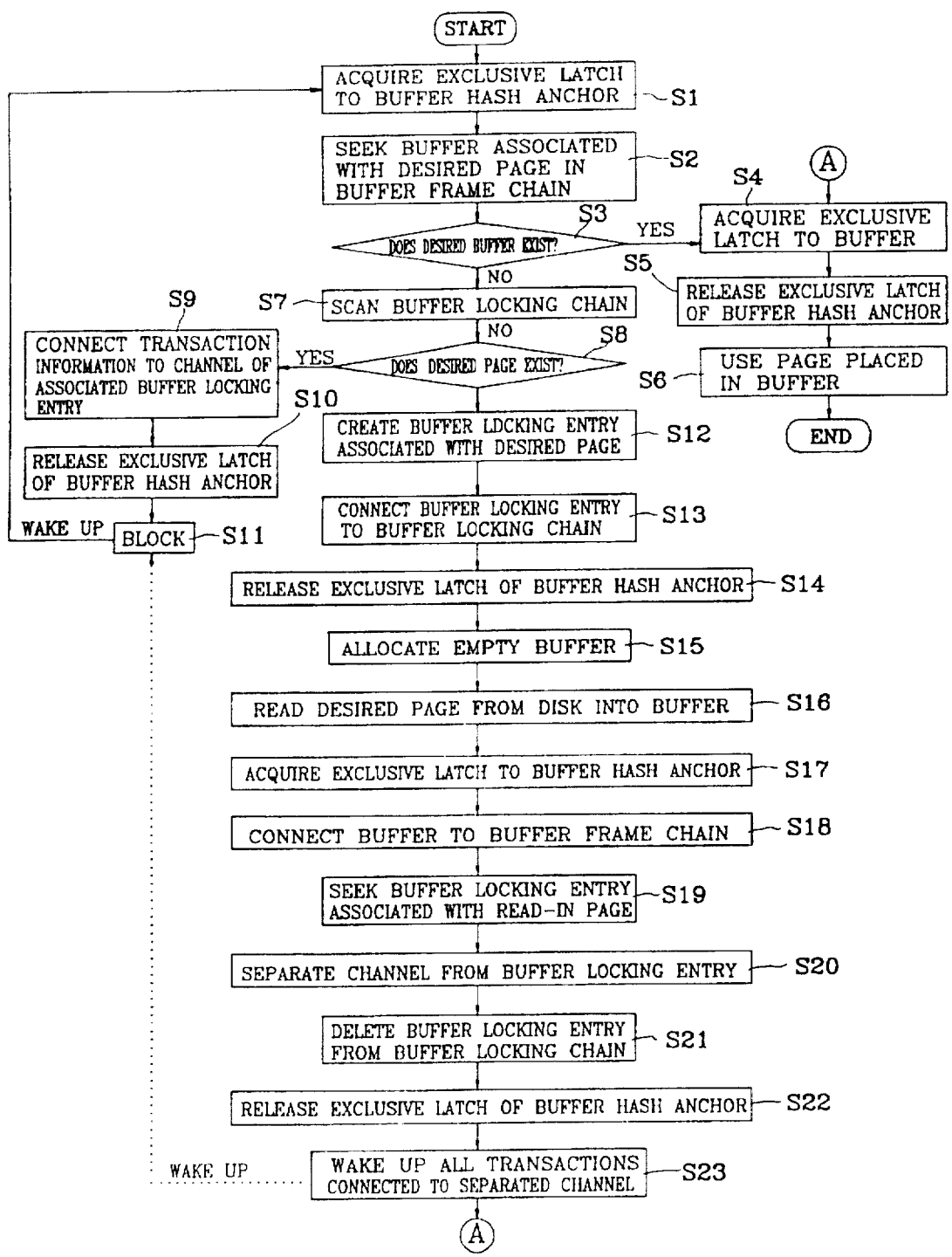
FIG. 5 is a flow chart of a buffer management method using the buffer locking mechanism in the procedure of processing a request for a desired page in accordance with the present invention.

FIG. 5 is a flow chart of a buffer management method using the above-mentioned buffer locking mechanism in the procedure of processing the request for a desired page in accordance with the present invention.

In accordance with the buffer management method, when a transaction accesses to an optional page, it acquires an exclusive latch to the buffer hash anchor (Step S1) and then scans the buffer frame chain (Step S2).

It is then determined whether or not the buffer frame chain includes a desired buffer associated with a desired page (Step S3). Where the buffer frame chain includes the buffer associated with a desired page, an exclusive latch is acquired to that buffer (Step S4). Thereafter, the exclusive latch acquired to the buffer hash anchor is released (Step S5). The page placed in the buffer is then used (Step S6).

Where there is no buffer associated with a desired page in the buffer frame chain, the buffer locking chain is checked while maintaining the exclusive latch of the buffer hash anchor (Step S7).

By checking the buffer locking chain, it is determined whether or not the buffer locking chain includes a desired page (Step S8). If there is a desired page in the buffer locking chain, it is then determined whether or not there is a buffer locking entry associated with that page in the buffer locking entry. If there is such a buffer locking entry, the present transaction is registered in the channel of the buffer locking entry associated with a desired page to wait for the reading of that page into the buffer because the page is being read from the disk into a buffer by other transaction (Step S9). In this case, the exclusive latch of the buffer hash anchor is then released (Step S10). The procedure is then blocked (Step S11) till a wake-up state. In the wake-up state, the procedure is then repetitively executed from step S1.

If it is determined at step S8 that there is no information about a desired page in the buffer locking chain, the transaction is allocated with a buffer because there is no other transaction requiring that page. Subsequently, a buffer locking entry for the page is newly created so as to block requests of other transactions until the operation of reading the page from the disk is completed (Step S12). The buffer locking entry is then registered in the buffer locking chain (or connected to the buffer locking chain) (Step S13). Thereafter, the exclusive latch of the buffer hash anchor is released (Step S14). An empty buffer is then allocated (Step S15). A desired page is read from the disk into the empty buffer (Step S16).

An exclusive latch is then acquired again to the buffer hash anchor (Step S17). In this state, the buffer is connected to the buffer frame chain (Step S18).

The buffer locking entry associated with the read-in page is then sought from the buffer locking chain (Step S19). Subsequently, a channel is separated from the buffer locking entry (Step S20). The buffer locking entry is then deleted from the buffer locking chain, thereby releasing the locking of the page (Step S21).

In this state, the exclusive latch of the buffer hash anchor is released (Step S22). All transactions connected to the separated channel is then woken up so that they may be in their execution states, respectively (Step S23). Thereafter, the procedure is returned to step S5. Each transaction woken up from its blocked state executes the procedure from step S1.

The method of the present invention as mentioned above provides the following effects.

In accordance with the present invention, locking of a desired page is carried out only when there is no buffer associated with that page. Accordingly, it is possible to minimize the overhead for the page locking. On the other hand, in accordance with conventional methods, where page locking is kept every time a desired page is required, it is required to generated an overhead for maintaining a locking table for all pages to which transactions access. Such a page locking should be kept in an exclusive mode every time a buffer is used. As a result, there is a degradation in system performance.

Furthermore, in accordance with the present invention, it is possible to avoid unnecessary disk input/output operations, thereby maximizing the buffer management effect used to achieve an improvement in performance of storage systems.

Although the preferred embodiments of the invention have been disclosed for illustrative purposes, those skilled in the art will appreciate that various additions and substitutions are possible, without departing from the scope and spirit of the invention as disclosed in the accompanying claims.

What is claimed is:

1. A buffer management method for efficiently managing concurrent access of a number of users to the same page of a disk using a buffer management structure including buffer locking entries each used for a transaction, which currently executes a disk reading operation, to lock a desired page, a buffer locking chain adapted to maintain the buffer locking entries in the form of a list, a buffer frame chain provided with buffers for pages and a buffer hash anchor adapted to use an exclusive latch, thereby achieving an improvement in performance of a storage system, the method comprising the steps of:

(a) acquiring an exclusive latch to the buffer hash anchor by a transaction accessing to an optional page, and then determining whether or not a desired buffer associated with the page is included in the buffer frame chain;

(b) scanning the buffer locking chain only when it is determined at the step (a) that the buffer associated with the page is not included in the buffer frame chain, thereby determining whether or not a buffer locking entry associated with the page exists in the buffer locking chain;

(c) if it is determined at the step (a) that the buffer associated with the page is included in the buffer frame chain, then acquiring an exclusive latch to the buffer, releasing the exclusive latch of the buffer hash anchor, and using the page placed in the buffer;

(d) if it is determined at the step (b) that the buffer locking entry associated with the page exists in the buffer locking chain, then registering information about the transaction in a channel of the buffer locking entry, releasing the exclusive latch of the buffer hash anchor, and acquiring an exclusive latch to the buffer hash anchor after a predetermined blocking time elapses; and (e) maintaining the page in a locked state only when it is determined at the step (b) that the buffer locking entry associated with the page does not exist in the buffer locking chain.

2. The buffer management method in accordance with claim 1, wherein the step (e) comprises the steps of:

creating a buffer locking entry associated with the page, and connecting the buffer locking entry to the buffer locking chain;

releasing the exclusive latch of the buffer hash anchor, allocating an empty buffer, and reading the page from the disk into the empty buffer;

acquiring an exclusive latch to the buffer hash anchor, and connecting the buffer to the buffer frame chain;

seeking the buffer locking entry associated with the read-in page from the buffer locking chain, separating a channel from the sought buffer locking entry, and deleting the channel-separated buffer locking entry from the buffer locking chain, thereby releasing the page from its locked state;

releasing the exclusive latch of the buffer hash anchor, waking up all transactions connected to the separated channel, executing the step (a) for the transactions being in their execution states.

3. The buffer management method in accordance with claim 2, wherein the step of acquiring an exclusive latch to the buffer hash anchor at the step (e) is not executed while the allocation of the empty buffer for placing the page therein is required.

4. The buffer management method in accordance with claim 1, wherein the step of maintaining the page in a locked state is executed only when the page is one not sought in the buffer frame chain using an associated buffer locking entry, but read from the disk into the buffer.

* * * * *